United States Patent [19]

Trigilio

[11] Patent Number: 4,551,631
[45] Date of Patent: Nov. 5, 1985

[54] WIND AND SOLAR ELECTRIC GENERATING PLANT

[76] Inventor: Gaetano T. Trigilio, 5090 Arch St., Maple Hts., Ohio 44137

[21] Appl. No.: 628,271

[22] Filed: Jul. 6, 1984

[51] Int. Cl.[4] .............................. F03D 9/00; F03D 7/06
[52] U.S. Cl. ....................................... 290/55; 290/1 R; 290/44; 415/3; 415/2 R; 415/4
[58] Field of Search .................... 290/1 R, 1 C, 2, 42, 290/43, 44, 53, 54, 55; 416/132 B, 169 B, 121 A, 176 A, 41 A, 50 A, 197 A; 415/2, 2 A, 5, 4, 3 R; 417/330, 331, 333, 332

[56] References Cited

U.S. PATENT DOCUMENTS

| 4,039,849 | 8/1977 | Mater et al. | 290/44 X |
|---|---|---|---|
| 4,079,264 | 3/1978 | Cohen | 290/55 |
| 4,119,863 | 10/1978 | Kelly | 290/55 |
| 4,134,707 | 1/1979 | Ewers | 290/55 X |
| 4,142,822 | 3/1979 | Herbert et al. | 290/55 X |
| 4,289,444 | 9/1981 | Monk et al. | 415/3 R |
| 4,309,146 | 1/1982 | Hein et al. | 415/2 R |
| 4,370,559 | 1/1983 | Langley, Jr. | 290/1 R |
| 4,433,544 | 2/1984 | Wells et al. | 415/2 R X |
| 4,474,529 | 10/1984 | Kinsey | 415/2 R |
| 4,486,143 | 12/1984 | McVey | 415/2 R |

Primary Examiner—William M. Shoop, Jr.
Assistant Examiner—Shik Luen Paul Ip
Attorney, Agent, or Firm—Shlesinger, Arkwright, Garvey & Fado

[57] ABSTRACT

A wind energy collection and conversion system includes a plurality of turbine assemblies. The turbine assemblies rotate on a common axis transverse of a base. A plurality of shutter assemblies are disposed in a circular orientation around each of said turbine assembly and are independently operable for causing wind current to be directed thereby for rotating said turbine assemblies. Five wall elements extend outwardly tangential to the periphery defined by the shutter assemblies and intercept the wind current and direct the wind currents toward the shutter assemblies. A roof covers the power plant and thereby increases the overall efficiency.

18 Claims, 7 Drawing Figures

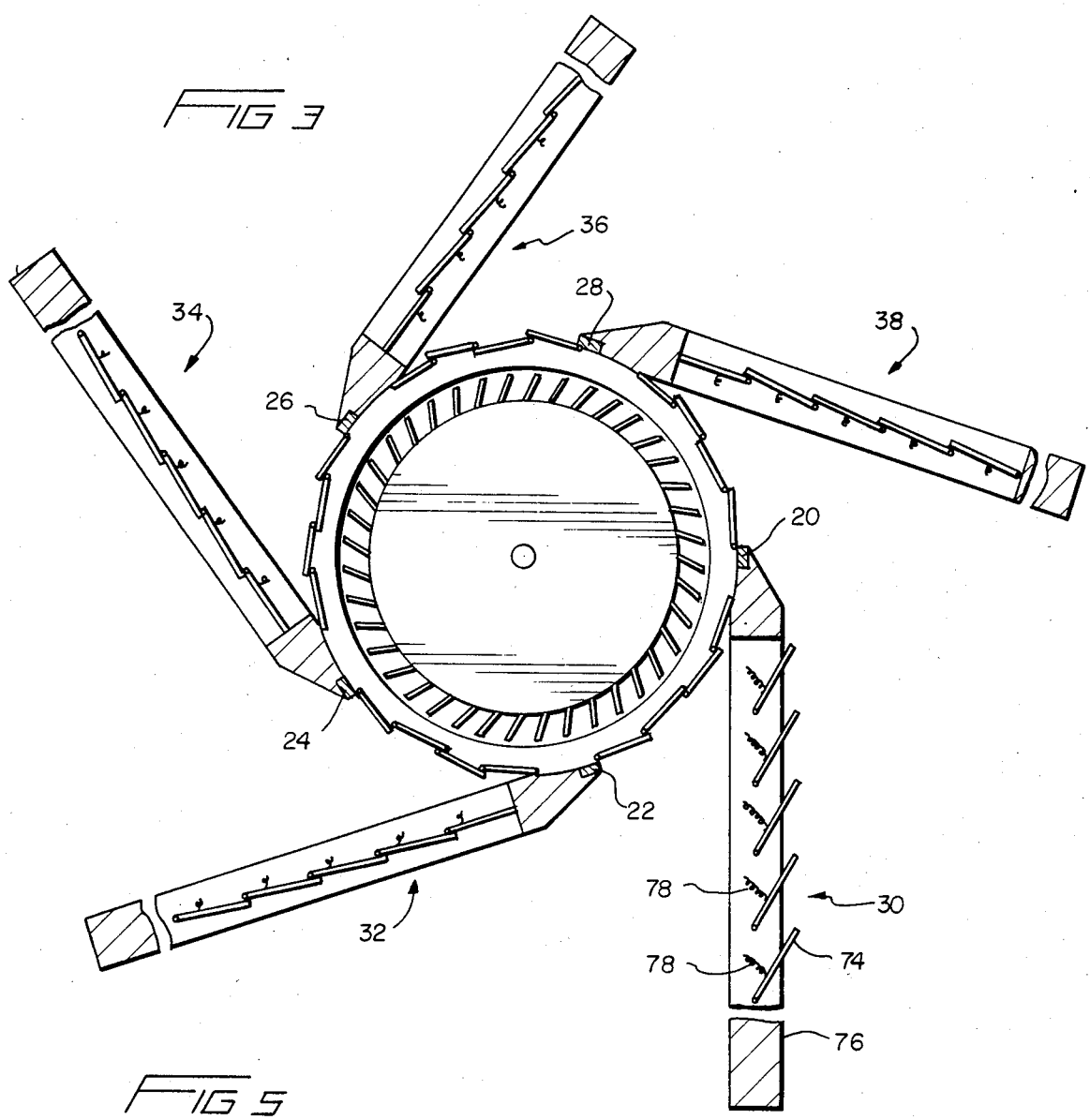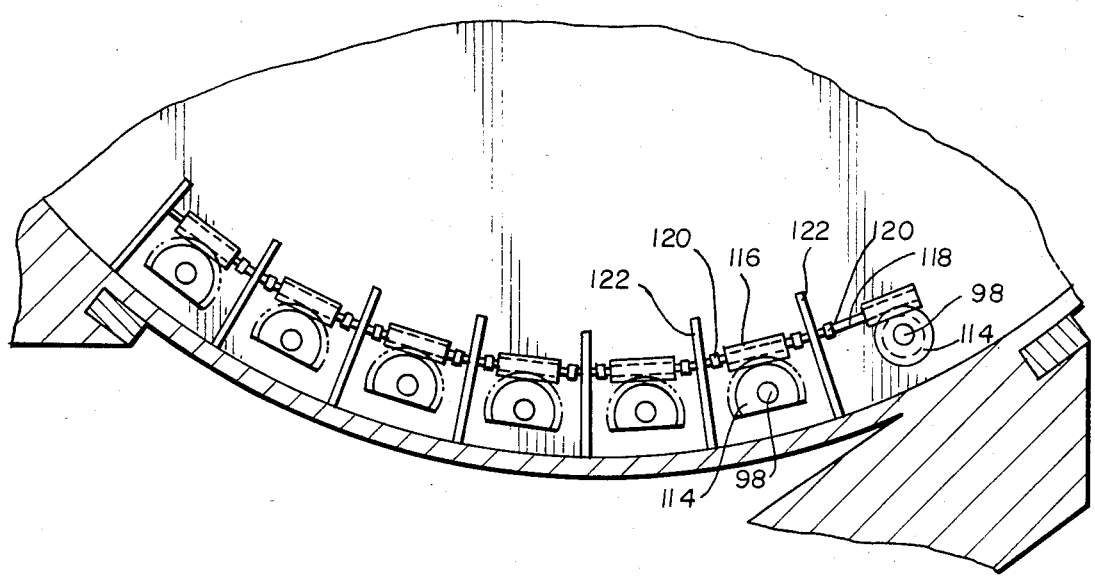

WIND AND SOLAR ELECTRIC GENERATING PLANT

BACKGROUND OF THE INVENTION

Electric power is usually generated by means of a fossil-fueled or hydraulic-powered turbine asembly. Fossil-fueled power plants have become increasingly costly from an operating point of view due to the greatly increased costs of the raw material, as well as the necessity of providing the plant with environmental protection. Nuclear-powered generating plants have also been subject to constantly increasing operating costs, as well as extremely stringent environmental safeguards. The constantly increasing operating costs of the cited plants have resulted in the cost of electric power to the consumer being greatly increased.

The Dutch harnessed wind power several centuries ago and utilized the harnessed power to operate pumps and the like. The increasing cost of electric power has recently increased the interest in harnessing wind power to generate electric power. This increased interest has lead to the development of wind farms and various wind operated turbine assemblies. Wind powered electric generation is desirable because there is no charge for use of the wind and environmental problems are eliminated or substantially alleviated. A wind-powered turbine assembly which efficiently utilizes the wind and which has a low capital cost would provide an effective means for minimizing the cost of electric power either through direct connection to the consumer or by supplementing conventionally generated electric power.

Solar energy also represents a free form of energy. The utilization of solar cells wherein light energy is converted to electric energy is well known. The cost of generating electric power by means of solar cells is, however, fairly expensive with the result that utilization to the benefit of consumers has been negligible. Solar-generated electric power does have the advantage, however, in that environmental problems are eliminated and because the solar cells represent a clean source of electric power.

One skilled in the art can appreciate, therefore, that a generating plant which combines efficient utilization of wind power with efficient utilization of solar energy would represent a means for reducing electric power costs. Such a combination plant must be capable of harnessing the wind from whichever direction the wind should be blowing. Similarly, the solar collection system must be capable of tracking the sun in order to optimize the production of solar generated electric power.

Monk, et al, U.S. Pat. No. 4,289,444 discloses a fluid energy convertor wherein a plurality of equiangularly disposed louvers are independently operated by a fluid energy-controlled louver actuation means.

Magoveny, et al, U.S. Pat. No. 4,047,834, discloses a horizontal multidirectional turbine windmill wherein a plurality of turbines are arranged in a stacked coaxial relation. Magoveny further discloses a plurality of equiangularly positioned fixed vertical means for directing the wind inwardly toward the turbine.

Kennon, U.S. Pat. No. 4,237,484, discloses a wind turbine means having a plurality of equiangularly disposed baffle plates. The reference further discloses a plurality of progressively operable wind flap elements.

OBJECTS AND SUMMARY OF THE INVENTION

A primary object of the disclosed invention is to provide a wind and solar electric generating plant which efficiently and economically converts wind energy and solar energy into electric power.

The disclosed invention provides a plurality of wind operated turbine assemblies which are disposed in spaced coaxial parallel relationship and which are adapted for rotating on a common axis. A plurality of shutter assemblies are disposed in a circular relation around each of the turbine assemblies, the shutter assemblies are disposed in sets, and the shutter sets are independently controllable to thereby effectuate optimum control of the associated turbine assemblies. Five outwardly depending wall assemblies extend from the shutter assemblies. The wall assemblies are generally tangential to the circular periphery defined by the shutter assemblies. Applicant has discovered that the arrangement of the wall assemblies provides optimum interception of the wind currents regardless of the direction from which the wind should blow.

The unique orientation of the wall assemblies results in a substantially right angle triangle which funnels the intercepted wind toward the shutter assemblies. One skilled in the art can appreciate that the funnel effect, particularly in cooperation with the roof assembly which extends over the power plant, results in optimum concentration and intensification of the wind. The individually operated shutter sets can be regulated so that the various turbine assemblies rotate at whatever speed is desired. A generator is operably associated with each of the turbine assemblies and generates electric power in cooperation with the rotation of the turbine assemblies. The wall assemblies each includes means for venting excess pressure in the event that the wind currents should be too strong.

A solar energy collection and conversion system is mounted on the roof assembly. A plurality of hydraulic cylinders or other motive means are provided for orienting and aligning the solar energy collection system with the sun to thereby optimize the conversion of solar energy to electric power. One skilled in the art can appreciate that there are those days when the sun does not shine and little wind is available. Consequently, the disclosed invention provides both a large scale storage battery assembly whereby excess electric power is stored so that it may be utilized on those bad weather days. Similarly, the power plant includes a conventional diesel-powered generating facility adapted for supplementing the output of the power generated by the plant. A computer control system is connected to the solar energy collection system, the control system for operating the shutter assemblies, the storage battery assembly and the diesel generator for thereby regulating and controlling the power output of the plant.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 3 is a cross-sectional view taken along the section 3—3 of FIG. 2 and viewed in the direction of the arrows and with broken lines indicating indeterminate length;

FIG. 5 is a fragmentary cross-sectional view taken along the section 5—5 of FIG. 2 and viewed in the direction of the arrows;

DESCRIPTION OF THE INVENTION

Figure 1:
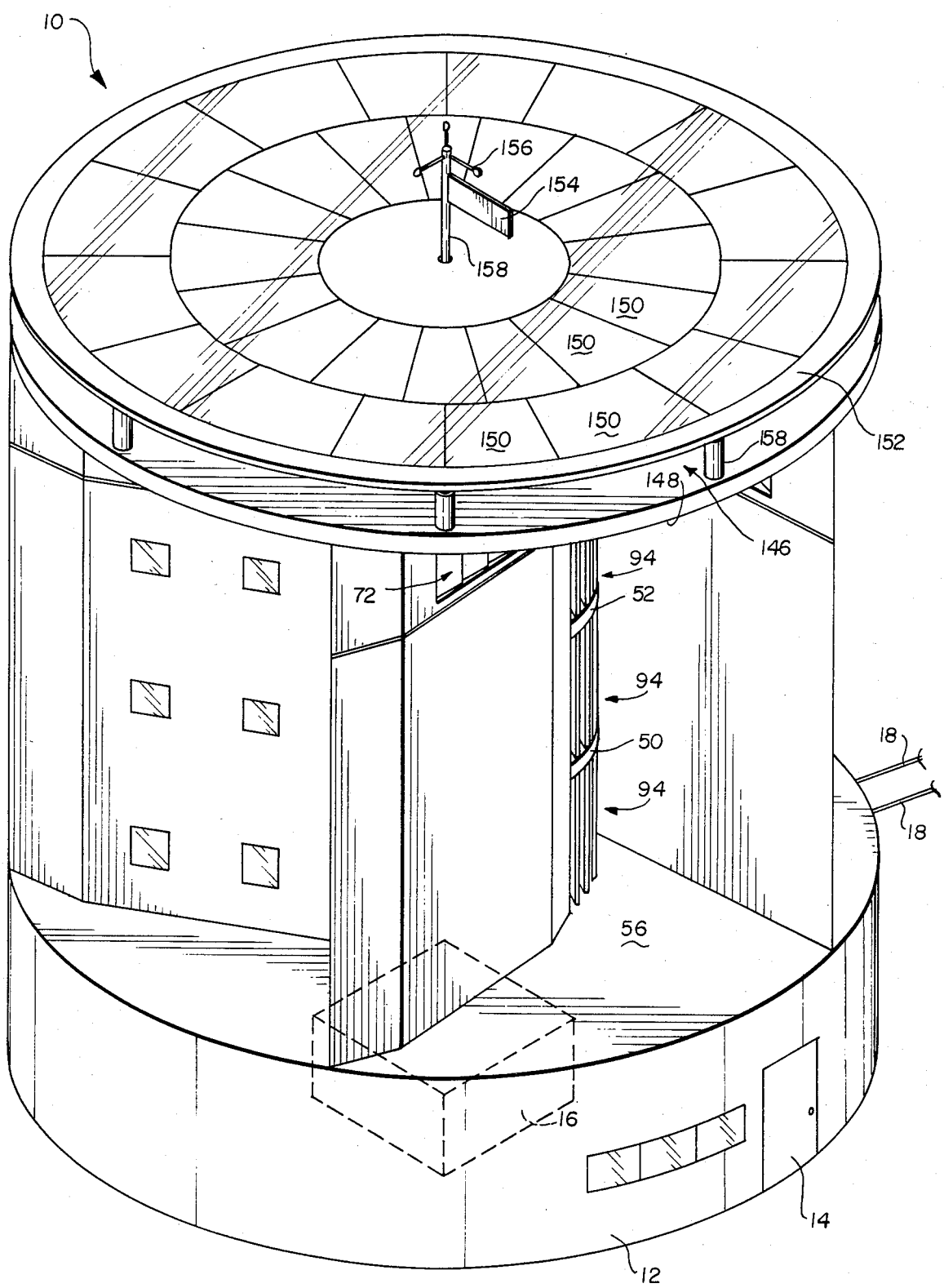
FIG. 1 is a perspective view of the wind and solar electric generating plant of the invention.

As best shown in FIG. 1, a wind and solar electric generating plant 10 includes a ground supported base 12. It can be seen in FIG. 1 that the base 12 is cylindrical in shape but one skilled in the art can appreciate that the shape and side of the base will be dependent upon the terrain upon which the plant is located and upon the size of the plant. The base 12 includes a door 14 to permit access to the rooms provided in the base 12. A conventional diesel-powered electric generator 16 is located in one of the rooms of base 12 and is adapted for supplementing or adding to the electric power generated by the plane 10. It can also be seen in FIG. 1 that power lines 18 extend from base 12 of plant 10 for providing the output of the plant 10 to the ultimate consumers.

Figure 4:
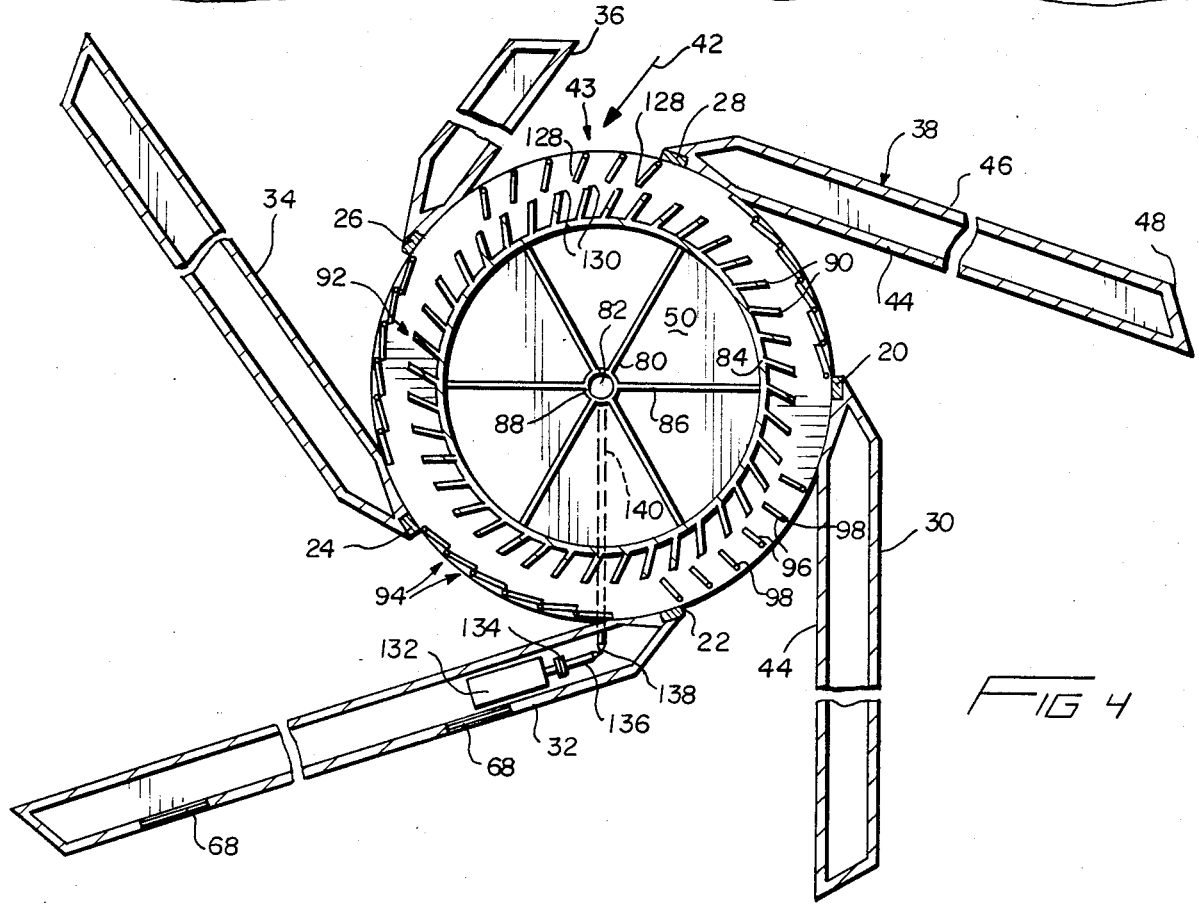
FIG. 4 is a cross-sectional view taken along the section 4—4 of FIG. 2 and viewed in the direction of the arrows, and with portions shown in phantom, and with broken lines indicating indeterminate length.

As best shown in FIGS. 3 and 4, beams 20, 22, 24, 26 and 28 extend upwardly from base 12 a substantial distance. The beams 20-28 are disposed along the outer periphery of base 12 and are disposed in an equiangularly equiradially spaced parallel relation. A plurality of vertical wall assemblies 30, 32, 34, 36 and 38 extend outwardly from each of the beams or support members 20-28, respectively. It can be noted that each of the wall assemblies 30-38 has a substantially uniform cross-section and each of the wall assemblies 30-38 includes a forward triangular tapered portion 40 which is secured to the respective beams 20-28. The tapered portion 40 of each of the wall assemblies 30-38 is secured to the associated beams 20-28 by means well known in the art. It can be appreciated from FIGS. 3 and 4 that each of the wall elements 30-38 is disposed at an angle of approximately 67° to the adjacent wall elements 30-38. The cooperating wall elements 30-38 define five generally triangularly-shaped funnel assemblies which are uniquely adapted for efficiently capturing wind currents and for directing the captured wind currents into the gap between the adjacent wall elements 30-38.

As best shown in FIG. 4, the wind currents, which are here shown by the arrow 42, are directed between the cooperating wall assemblies 36 and 38. It can be noted in FIG. 4 that a substantial distance or gap 43 is disposed between the adjacent beams 26 and 28 of the wall elements 36 and 38. The orientation of the wall assemblies 36 and 38 results in the wind currents 42 being directed between these cooperating wall assemblies 36 and 38 and toward the gap 43. One skilled in the art can appreciate that the wind may be coming out of any direction. The tangential orientation of the wall assemblies 30-38 is uniquely adapted for directing the wind current towards the space 43 between the adjacent beams 20-28. This tangential configuration optimizes the collection of the wind currents.

Each of the wall assemblies 30-38 includes an inner wall 44 extending substantially tangential to the periphery of base 12 and from the tapered portion 40. An outer wall element 46 also extends in spaced parallel relationship to inner wall 44 from tapered portion 40. An angularly disposed end wall element 48 connects the inner and outer wall elements 44 and 46 at the outer end thereof.

Figure 2:
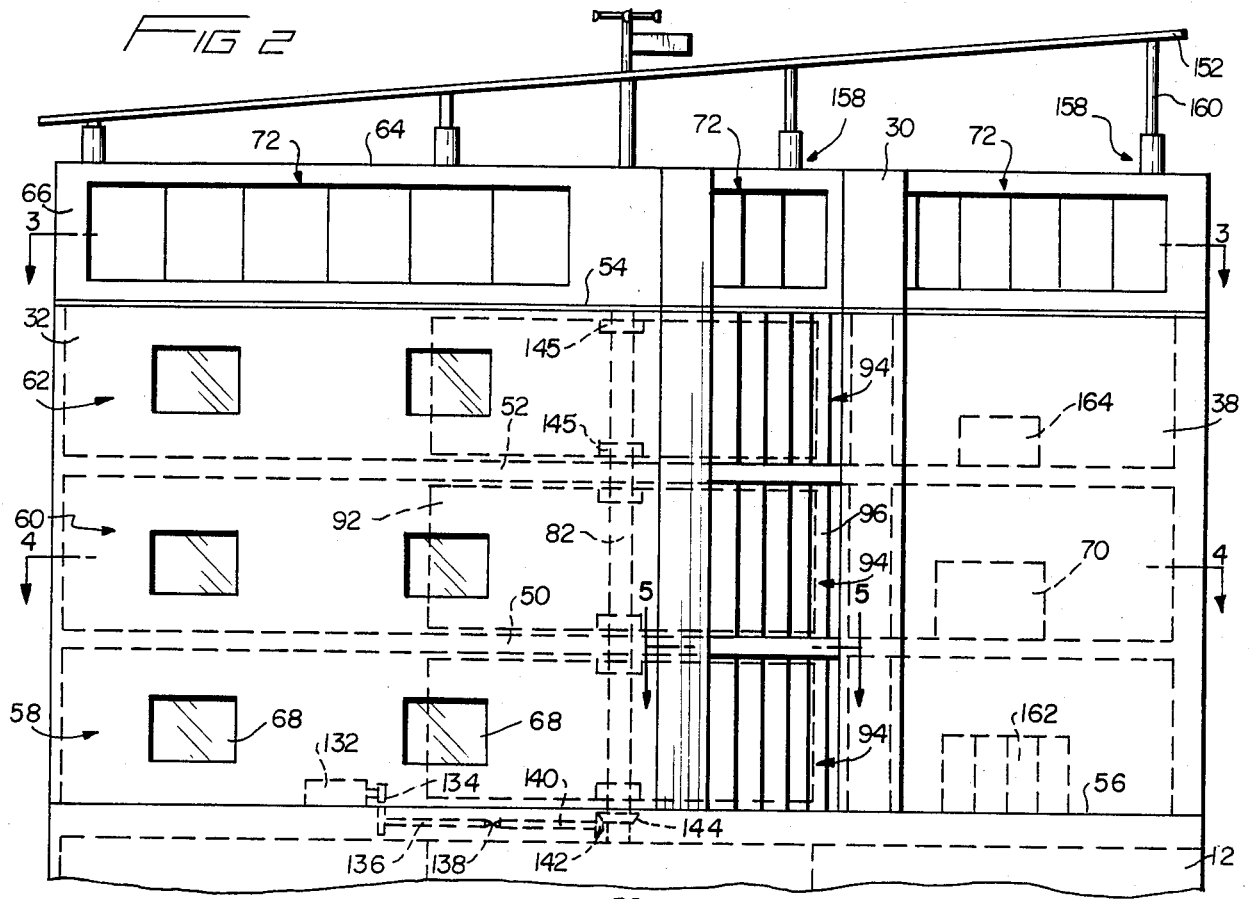
FIG. 2 is a side elevational view of the plant of FIG. 1 and with portions shown in phantom lines.

Wall elements 32 and 38 are best shown in elevation in FIG. 2. Wall assembly 32 has horizontal support members 50, 52 and 54 disposed in spaced parallel relation relative to the upper surface 56 of base 12. Support members 50, 52 and 54 also cover the area above base 12 and between beams 20-28. Consequently, a cylindrical tower is provided from which the walls 30-38 extend. Surface 56 and support element 50 define a first level 58. Support elements 50 and 52 define a second level 60. Support elements 52 and 54 define a third level 62, while support element 54 and the upper surface 64 thereof define a fourth level 66. It can be noted that levels 58-62 include windows 68 to permit the occupants (not shown) of the offices contained on the levels 58-62 to look outwardly. It can be noted from FIGS. 3 and 4 that the wall assemblies 30-38 have substantial length and width with the result that offices are provided in the various levels of the wall assemblies 30-38. These offices contain the control system and other mechanisms to operate the power plant 10.

The other remaining wall assemblies 30, 34-38 have similar levels 58-62 and 66 and further discussion thereof is not deemed necessary. Level 60 of wall element 38, however, contains a computer control system 70 disposed in one of the offices thereof. Further elaboration on the computer control 70 will be provided herein later.

As best shown in FIG. 3, a plurality of back pressure vent assemblies 72 are disposed in upper level 66. Each of the back pressure vent assemblies 72 includes a shutter 74 which is pivotal on a shaft 76 between an open and a closed position. Preferably, springs 78 are connected to each of the vents 74 and its associated wall assembly 30-38 in order to spring load the back pressure vent assemblies 72 in the closed orientation. The back pressure vent assemblies 72 are spring loaded in order to vent excess pressure which may develop between the wall elements 30-38 should the wind currents be too strong. The back pressure vent assemblies 72, therefore, stabilize the wall elements 30-38 because the springs 78 keep the vents 74 in the closed orientation when the back pressure, or the force of the wind currents is less than a predetermined level. Should the wind currents and therefore the back pressure, exceed a predetermined level, then the back pressure vent assemblies 72 swing open and thereby permit the wind currents to vent into the next funnel-shaped wind directing area.

As best shon in FIG. 4, turbine frame 80 is rotatably supported on support member 50 and is adapted for rotating shaft 82. Frame 80 has a generally circular periphery 84 which is joined to shaft 50 by spokes 86. Spokes 86 are connected to member 88 which mounted to shaft 82. It should be noted in FIG. 4 that periphery 84, spokes 86 and member 88 are manufactured from hollow tubing. The tubing is, preferably, filled with helium gas in order to provide some lift to the turbine assembly 92 and to minimize frictional forces.

A plurality of angularly-disposed wind-engaging vanes 90 extend from circular periphery 84. Wind engaging vanes 90 are disposed in an equiangular relation around periphery 84. Adjacent vanes 90 are maintained in spaced parallel relation and in this way, wind currents, such as currents 42, impinging on vanes 90 cause the turbine assembly 92 to rotate. Turbine assembly 92 is comprised of the members 84–90. It can be noted in FIG. 2 that the turbine asembly 92 has substantial diameter and a substantially cylindrical configuration with substantial height. The vanes 90 substantially span the distance between the horizontal support members 50 and 52 and in this way maximum utilization of the wind currents is obtainable. Similar turbine assemblies 92 are provided for each of levels 58 and 62. One skilled in the art can appreciate that while three levels 58–62 and associated turbine assemblies 92 are disclosed, a greater or lesser number of turbine assemblies 92 and levels 58–62 may be provided without detracting from the performance of the invention.

As best shown in FIG. 4, a plurality of shutter assemblies 94 are disposed around the periphery of support level 50. Each of the shutter assemblies 94 includes a shutter 96 which is secured to pivotal shaft 98. The shutters 96 are pivoted by rotation of the shafts 98 on the longitudinal axes thereof between an open position and a closed position. Wind currents are blocked from impinging on vanes 90 when shutters 94 are in the closed position.

Figure 6:
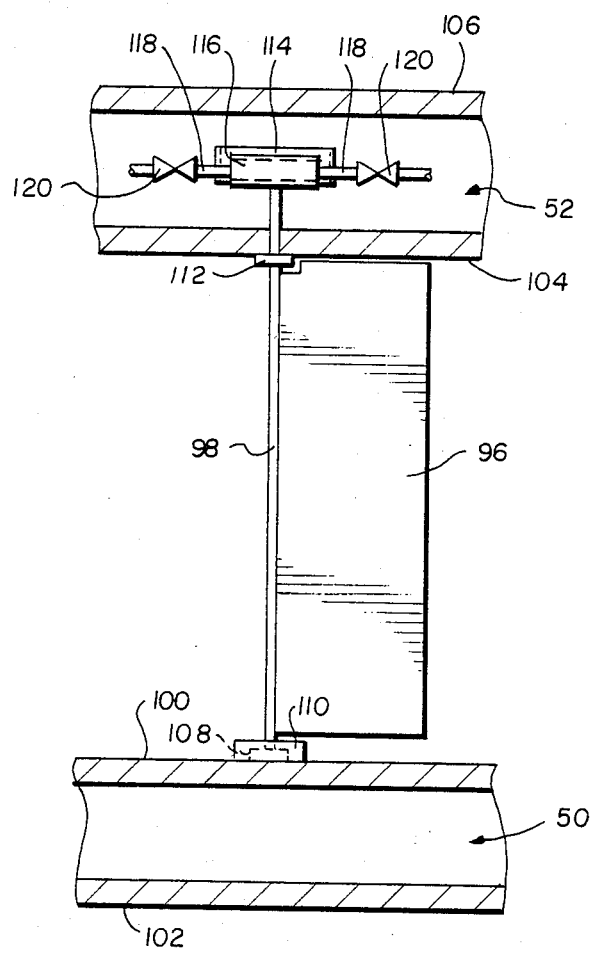
FIG. 6 is a front elevational view of one of the shutter assemblies of the invention; and, FIG. 7 is a fragmentary front elevational view of the system for pivoting the shutter assemblies of FIG. 5.

As best shown in FIG. 2, the shutters 96 of each shutter assembly 94 extend between the support members 50 and 52. Similarly, each of the levels 58–62 have an associated plurality of shutter assemblies 94 disposed around the periphery thereof. As best shown in FIG. 6, support member 50 includes an upper surface 100 and a lower surface 102. Similarly, support member 52 includes an upper surface 104 and a lower surface 106. It can be appreciated that support member 54 has corresponding upper and lower surfaces.

It can be seen in FIG. 6 that support members 50 and 52 are actually hollow beams, although substantial reinforcing thereof is contemplated. Shaft 98 extends upwardly from bearing 108 and thrust bearing 110. A cover member (not shown) may be disposed over thrust bearing 110 in order to prevent the entry of dirt or other contaminants therein. Bearing assembly 112 extends downwardly from the lower surface 104 of support member 52 and is disposed about the upper end of shaft 98. It can be appreciated that the bearings 108, 110 and 112 have coaxial apertures (not shown) for receiving the appropriate portions of shaft 98. The bearings 108, 110 and 112 permit the shaft 98 to rotate freely between the open and closed position.

Gear 114 is mounted to the upper end of shaft 98 and engages pinion gear 116. Rotation of vinion gear 116 causes corresponding angular rotation of gear 114 which thereby causes the shaft 98 to rotate. Consequently, rotation of pinion gear 116 causes associated rotation of shafts 98 and hence of shutters 96. Shafts 118 extend longitudinally from pinion gear 116 and flexible coupling 120 is mounted thereon. Flexible coupling 120 comprises a ball joint or other flexible coupling well known in the art.

As best shown in FIG. 4, the shutter assemblies 94 are disposed between adjacent beams 20–28 of wall elements 30–38. The shutter assemblies 94 of each level 58–62 are arranged in shutter sets with each of the shutter sets associated with the open area 43 between adjacent beams 20–28 of wall elements 30–38. One skilled in the art can appreciate that cooperative orientation and control of the rotation of the shutter assemblies 94 of a shutter set permit precise control over the rotation of the turbine assemblies 92.

As best shown in FIG. 5, adjacent shafts 98 of the shutter assemblies 94 of a shutter set have the pinion gears 116 thereof connected by means of shafts 118 and flexible couplings 120. Preferably, a plurality of support members 122 extend radially inwardly from the outer periphery of the circular support members 50–52. The support members 122 contain apertures to permit passage therethrough of the appropriate shafts 118. Preferably, the apertures (not shown) contain a bearing assembly to permit the shafts 118 to freely rotate therein. It can be seen from FIG. 5 that the connected shafts 118 conform to the circular periphery of the horizontal supports 50–54.

Figure 7:
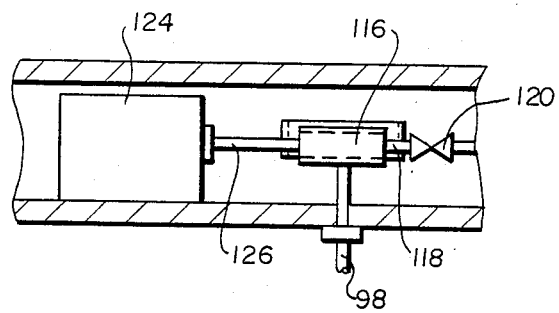

One skilled in the art can appreciate that rotation of the pinion gears 116 results in the shafts 98 of a shutter set all rotating a substantially equiangular amount. Consequently, the shutters 94 of a shutter set are disposed in cooperative relationship. As best shown in FIG. 7, electric motor 124 has the output shaft 126 thereof connected to pionion gear 116. Shaft 118 extends from pinion gear 116 and ultimately to flexible coupling 120. Rotation of shaft 126 of motor 124 in either the clockwise or the counterclockwise direction causes corresponding cooperative rotation of the connected pinion gears 116. Consequently, operation of electric motor 124 controls the pivoting of the shutter assemblies 94 and thereby controls the amount of wind energy impinging on the vanes 90 of the turbine assemblies 92.

It can be appreciated that each shutter set of shutter assemblies 94 of the levels 58–62 has its own independently operable electric motor 124. This allows the shutter assemblies of each shutter set to be independently operative. This permits precise regulation of the rotation of the turbine assemblies 92 of each level 58–62. It can be noted in FIG. 4, that the shutter assemblies 94 between the wall elements 36 and 38 are disposed in substantially the open orientation. This results in the wind currents 42 directed by the wall elements 36 and 38 impinging on the vanes 90 of the turbine assembly 92 and thereby causing the turbine assembly 92 to rotate. It can also be noted that the shutter assemblies 94 disposed between the wall elements 30 and 32 are in the open position. The remaining shutter assemblies 94 are in the closed orientation. The open shutter assemblies 94 between the wall elements 30 and 32 permit the air to exhaust after its energy has been captured.

Also to be noted in FIG. 4 is that the shutter assemblies 94, when in the open orientation, have the edge 128 thereof which is spaced from the shaft 98 radially spaced a substantial distance from the outer edge 130 of the vanes 90. Applicant has learned that this spacing is necessary if the turbine assembly 92 is to be capable of rotating freely. For some reason, as yet unknown, close proximity of the edges 128 and 130 has the effect of substantially reducing the capability for angular rotation of the turbine assembly 92 on the shaft 82.

As best shown in FIG. 4, generator 132 is disposed in wall element 32 and is connected to clutch 134 in a manner well known in the art. Shaft 136 extends from clutch 134 and is connected to flexible coupling 138. Flexible coupling 138 is connected to shaft 140 which is geared to shaft 82. Consequently, rotation of turbine assembly 92 causes associated rotation of the shaft 82 and of the shaft 136 which thereby causes generator 132 to generate electric power.

As best shown in FIG. 2, a similar generator 132 on level 58 is connected to the shaft 82 thereof by gears 142 and 144 in a manner well known in the art. It can be appreciated that each of the turbine assemblies 92 has its own generator 132. Similarly, each of the turbine assemblies 92 is mounted to its own independently rotatable shaft 82. Preferably, bearing assemblies 145 are provided at the upper and lower ends of shafts 82 to permit free rotation thereof. Consequently, independent rotation of the turbine assemblies 92 of each of the levels 58-62 permits conversion of the wind power in a most efficient manner. It can be appreciated that regulation of the shutter assemblies 94 of each of the levels 58-62 permits precise control over the rotational speed of the turbine assemblies 92. Additionally, turbines 92 or generators 132 may be taken out of service for repairs or the like while the remaining turbines 92 continue to operate.

As best shown in FIG. 1, roof 146 extends radially outwardly from the common axis defined by the shafts 82. The roof 146 spans the substantial distance of the wall elements 30-38 and thereby puts an upper cap on the power plant 10. The roof 146 causes the wind currents to be contained between the cooperating wall elements 30-38 and between the upper surface 56 of base 12 and the lower surface 148 of roof 146. Furthermore, the wall elements 30-38 may extend beyond base 12 and the roof 146 serves to thereby trap the wind between the ground and the roof 146. The roof 146 causes the wind currents to be trapped therein and the convergence of the cooperating wall assemblies 30-38 serves to magnify or increase the intensity of the wind currents trapped therein.

A plurality of solar cells 150 are secured to a support member 152. The support member 152 defines a frame for receiving the solar cells 150 and for covering the roof 146. It can be noted in FIG. 1 that a wind meter 154 and an anemometer 156 are mounted to shaft 158 which extends upwardly from roof 146 through an aperture in frame 152.

As best shown in FIGS. 1 and 2, hydraulic cylinder and piston assemblies 158 are disposed about roof 146 and have the piston 160 thereof connected to frame 152. Displacement of the pistons 160 causes the frame 152 to tilt, as best shown in FIG. 2, and thereby permits the frame 152 to be continuously aligned with, and to track, the sun. One skilled in the art can appeciate that appropriate displacement of selected cylinder and piston assemblies 158 causes the frame 152 to tilt. The frame 152 thereby tracks the passage of the sun. This assures that the solar cells 150 are continuously aligned with the sun, thereby optimizing the production of electric power therefrom.

As best shown in FIG. 2, a plurality of storage batteries 162 are disposed in level 58 of wall element 38. Batteries 162 are connected to each of generators 132 and to solar cells 150. Batteries 162 permit excess electric power to be stored in the event that the power plant 10 is incapable of supplying sufficient electric power through cables 18. Also, computer control 70 is connected, by means well known in the art, to hydraulic control package 164 disposed in level 62 of wall assembly 38. The hydraulic control package is connected to the cylinder and piston assemblies 158. The computer control 70 operates the hydraulic control 164 and its associated conventional hydraulic control valves and thereby causes the frame 152 and the solar cells 150 to be aligned with the sun.

Additionally, the computer control 70 is connected with each of the electric motors 124 and thereby controls the opening and closing of the shutter assemblies 94 of each shutter set of each level 58-62. Preferably, the wind meter 154 and the anemometer 156 are directly connected to the computer control 70 to permit automatic regulation of the opening and closing of the associated shutter assemblies 94. Computer control 70 also controls the opening and closing of associated shutter sets to allow the wind to exhaust from the turbines 92.

Furthermore, the computer control 70 is connected to each of the generators 132, the storage batteries 162, and to the diesel generator 16. The computer control 70, which includes an appropriately programmed mainframe computer or a network of mini-computers, controls the power plant 10 operation. The computer control 70 thereby optimizes the operating efficiency of the power plant 10 and assures that the shutter assemblies 94 are optimally regulated to thereby generate the maximum electric power from the turbines 92. Similarly, the computer control 70 controls the orientation and alignment of the solar cells 150 with the sun and thereby assures that maximum conversion of solar and wind power will be effectively transmitted over the power lines 18, or stored in the storage batteries 162. Similarly, the computer control 70 controls the operation of diesel generator 60 so that the output thereof can supplement or add to the power generated by the plant 10.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the essential features hereinbefore set forth, and fall within the scope of the invention of the limits of the appended claims.

What I claim is:

1. A wind energy collection and conversion system, comprising:
   (a) a base having a periphery;
   (b) a turbine assembly rotatably supported on said base and said turbine assembly including a plurality of wind current engaging vanes so that wind current impinging on said vanes causes said turbine assembly to rotate;
   (c) generator means operably connected to said turbine assembly for generating electric power while said turbine assembly is rotating;
   (d) a plurality of support members spaced from said turbine assembly proximate said periphery and said support members extending upwardly generally from said base and generally parallel to the axis of rotation of said turbine assembly;
   (e) a plurality of shutter assemblies spaced from said turbine assembly, each of said shutter assemblies disposed between and adjacent two of said support members;
   (f) each of said shutter assemblies including a plurality of pivotal shutter means and the shutter means of a shutter assembly are mutually positionable between an open and a closed position for regulating the wind current flowing between the associated support members toward said turbine assembly;

(g) pivot drive means operably interconnecting each shutter means of a shutter assembly for simultaneously pivoting the shutter means of a shutter assembly and for thereby mutually positioning the shutter means of a shutter assembly between the open and closed positions;

(h) wind current direction sensing means;

(i) control means operably associated with said wind current direction sensing means and with each of said pivot drive means for causing the shutter means of each shutter assembly to be selectively positioned between the open and closed positions based upon the direction of the wind current and for thereby regulating the speed of rotation of said turbine assembly;

(j) a wall assembly outwardly extending a substantial distance from each of said support members for intercepting wind currents and for directing the wind currents generally towards an associated shutter assembly and said wall assemblies extending generally tangential to said periphery; and, (k) a roof assembly connected to an upper end portion of said wall assemblies and substantially spanning the distance between said wall assemblies so that wind currents intercepted by said wall assemblies are directed toward said shutter assemblies.

2. The system as defined in claim 1, wherein:
(a) control means are associated with each of said pivot drive means for independently controlling pivoting of said shutter assemblies.

3. The system as defined in claim 1, wherein:
(a) each of said shutter means includes a longitudinally extending shutter member having substantial length and width;
(b) a rotatable shaft extending from said base and said shutter member being secured thereto and pivotal therwith; and,
(c) said pivot drive means being associated with each of said shafts for rotating said shafts and thereby pivoting said shutter members.

4. The system as defined in claim 3, wherein:
(a) pivoting means being associated with each of said shafts at generally one end thereof; and,
(b) said pivot drive means being associated with said pivoting means for causing pivoting of said shutter members.

5. The system as defined in claim 4, wherein:
(a) said pivoting means including a gear; and,
(b) said pivot drive means includes a worm drive assembly operably engaged with said gear.

6. The system as defined in claim 5, wherein:
(a) said worm drive assembly of each shutter member of a shutter assembly being interconnected to adjacent worm drive assemblies whereby said shutter members of each shutter assembly are pivoted an equiangular amount.

7. The system as defined in claim 6, wherein:
(a) said worm driven assembly including a worm gear associated with each of said gears;
(b) a flexible coupling connecting adjacent worm gears; and,
(c) electric motor means being connected to an end one of said worm gears for thereby causing corresponding rotation of said worm gears.

8. The system as defined in claim 1, wherein:

(a) a plurality of turbine assemblies are rotatably disposed on a common axis in spaced longitudinal relation;
(b) generator means being operably associated with each of said turbine assemblies;
(c) a plurality of shutter assemblies being associated with each of said turbine assemblies; and,
(d) control means being associated with said plurality of shutter assemblies for independently controlling pivoting of the shutter assemblies of each of said turbine assemblies for permitting regulation of rotation of each of said turbine assemblies.

9. The system as defined in claim 8, wherein:
(a) said common axis is generally transverse to said base and thereby providing an upper and a lower turbine assembly;
(b) each of said wall assemblies including a portion thereof extending upwardly beyond said upper turbine assembly; and,
(c) wind current pressure diverting means being associated with one of said roof assembly and said portion for venting excess pressure.

10. The system as defined in claim 9, wherein:
(a) each of said shutter assemblies includes a shutter member having substantial length and width; and,
(b) said shutter members are spaced from the associated turbine assembly vanes a distance exceeding the shutter member width.

11. The system as defined in claim 9, wherein:
(a) said wind current pressure diverting means includes at least a first back pressure vent assembly; and,
(b) means being associated with said at least a first back pressure vent assembly for automatically operating said at least a first back pressure vent assembly.

12. The system as defined in claim 8, wherein:
(a) battery means being associated with at least one of said wall assemblies and being electrically connected to each of said generator means for storing excess electric power; and,
(b) solar collector means being associated with said roof assembly and electrically connected to said battery means and being adapted for converting solar energy to electric power whereby said electric power is stored by said battery means.

13. The system as defined in claim 12, wherein:
(a) said solar collector means including a plurality of solar panels secured to a support frame; and,
(b) displacement means being associated with said roof assembly and said support frame and being adapted for continuously aligning said solar panels with a source of solar energy.

14. The system as defined in claim 12, wherein:
(a) supplemental generator means being associated with said base for independently generating electric power; and,
(b) computer control means being operably connected to said solar collector means, to said shutter assemblies of each of said turbine assemblies, to said supplemental generator means and to said battery means for regulating electric power output thereof.

15. A wind energy collection and conversion system, comprising:
(a) a generally circular base having a periphery;
(b) a plurality of spaced parallel support elements disposed in longitudinally spaced parallel relation;

(c) a plurality of turbine assemblies, each of said turbine assemblies rotatably supported by one of said support elements and each of said turbine assemblies including a plurality of wind current engaging vanes;

(d) each of said turbine assemblies includes a cylindrical frame rotatable on an axis and said vanes depending generally radially outwardly from the periphery of said frame;

(e) said turbine assemblies are rotatable on a common axis;

(f) five equiangularly disposed upwardly extending support members depend from said base and each of said support members equiradially spaced from said common axis;

(g) a plurality of shutter assemblies spaced from each of said turbine assemblies, each of said shutter assemblies disposed between and adjacent two of said support members;

(h) each of said shutter assemblies including a plurality of pivotal shutter means and the shutter means of a shutter assembly are mutually positionable between an open and a closed position for regulating the wind current flowing between the associated support members towards the associate turbine assembly;

(i) pivot drive means operably interconnecting each shutter means of a shutter assembly for simultaneously pivoting the shutter means of a shutter assembly and for thereby mutually positioning the shutter means of a shutter assembly between the open and closed positions;

(j) wind current direction sensing means;

(k) control means operably associated with said wind current direction sensing means and with each of said pivot drive means for causing the shutter means of each shutter assembly to be selectively positioned between the open and closed positions based upon the direction of the wind current and for thereby regulating the speed of each of said turbine assemblies;

(l) a wall assembly outwardly depending from each of said support members a substantial distance and tangential to said periphery for intercepting wind currents and for directing the wind currents generally toward associated ones of said shutter means;

(m) said wall assemblies have substantial height so that an upper portion thereof extends beyond an upper one of said turbine assemblies;

(n) generator means operably associated with each of said turbine assemblies generating electric power upon rotation of an associated turbine assembly; and, (o) a roof assembly covering said turbine assemblies and said wall assemblies so that intercepted wind currents are directed by said shutter assemblies toward said vanes for thereby rotating said turbine assemblies.

16. The system as defined in claim 15, wherein:
(a) each of said shutter assemblies includes a longitudinally extending shutter member having substantial length and width;
(b) a rotatable shaft extending from each of said support elements and said shutter member being secured thereto and pivotal therewith; and,
(c) said pivot drive means being associated with each of said shafts for rotating said shafts and thereby pivoting said shutter members.

17. The system as defined in claim 15, wherein:
(a) pivoting means being associated with each of said shafts at generally one end thereof; and,
(b) said pivot drive means being associated with said pivoting means for causing pivoting of said shutter members.

18. The system as defined in claim 17, wherein:
(a) said pivoting means including a gear; and,
(b) said pivot drive means including a worm drive assembly operably engaged with said gear.

* * * * *